United States Patent
Wang et al.

(10) Patent No.: US 10,438,614 B1
(45) Date of Patent: Oct. 8, 2019

(54) METHOD AND APPARATUS FOR DEGAUSSING HEAT-ASSISTED MAGNETIC RECORDING MEDIA

(71) Applicant: Seagate Technology LLC, Cupertino, CA (US)

(72) Inventors: Kangkang Wang, Fremont, CA (US); Ganping Ju, Pleasanton, CA (US); Edward Charles Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 311 days.

(21) Appl. No.: 15/484,383

(22) Filed: Apr. 11, 2017

Related U.S. Application Data

(60) Provisional application No. 62/321,017, filed on Apr. 11, 2016.

(51) Int. Cl.
| | | |
|---|---|---|
| *G11B 5/245* | (2006.01) | |
| *G11B 5/024* | (2006.01) | |
| *H01F 13/00* | (2006.01) | |
| *H01F 6/06* | (2006.01) | |
| *B23K 26/00* | (2014.01) | |
| *B23K 26/082* | (2014.01) | |
| *B23K 26/08* | (2014.01) | |
| *G11B 5/00* | (2006.01) | |

(52) U.S. Cl.
CPC ........ *G11B 5/0245* (2013.01); *B23K 26/0006* (2013.01); *B23K 26/082* (2015.10); *B23K 26/0823* (2013.01); *H01F 6/06* (2013.01); *H01F 13/006* (2013.01); *G11B 2005/0021* (2013.01)

(58) Field of Classification Search
CPC ............ G11B 5/0245; G11B 2005/002; B23K 26/082; B23K 26/0006; B23K 26/0823; H01F 6/06; H01F 13/006
See application file for complete search history.

(56) References Cited

U.S. PATENT DOCUMENTS

| | | | |
|---|---|---|---|
| 8,345,402 B2 * | 1/2013 | Schultz | G11B 5/0245 361/143 |
| 2005/0141118 A1 * | 6/2005 | Ito | G11B 5/012 360/66 |
| 2006/0023389 A1 * | 2/2006 | Ito | G11B 5/0245 361/143 |
| 2010/0209737 A1 * | 8/2010 | Bian | G11B 5/65 428/827 |
| 2013/0286802 A1 * | 10/2013 | Kiely | G11B 13/04 369/13.31 |
| 2014/0240864 A1 | 8/2014 | Livschitz et al. | |

\* cited by examiner

*Primary Examiner* — Pete T Lee
(74) *Attorney, Agent, or Firm* — Mueting, Raasch & Gebhardt, P.A.

(57) ABSTRACT

An apparatus comprises a magnet housing dimensioned to receive a heat-assisted magnetic recording (HAMR) medium or a hard disk drive comprising at least one HAMR medium. A degausser is disposed in the magnet housing and is configured to generate at least one field sufficient to erase the HAMR medium, where the HAMR medium has a coercivity of between about 20 and 100 kOe at room temperature.

19 Claims, 5 Drawing Sheets

METHOD AND APPARATUS FOR DEGAUSSING HEAT-ASSISTED MAGNETIC RECORDING MEDIA

RELATED APPLICATIONS

This application claims the benefit of Provisional Patent Application Ser. No. 62/321,017 filed on Apr. 11, 2016, to which priority is claimed pursuant to 35 U.S.C. § 119(e) and which is hereby incorporated herein by reference in its entirety.

SUMMARY

Embodiments discussed herein involve an apparatus comprising a magnet housing dimensioned to receive a heat-assisted magnetic recording (HAMR) medium or a hard disk drive comprising at least one HAMR medium. A degausser is disposed in the magnet housing and is configured to generate at least one field sufficient to erase the HAMR medium, where the HAMR medium has a coercivity of between about 20 and 100 kOe at room temperature. In certain embodiments the degausser comprises a heat-assisted degausser.

Further embodiments are directed to a method involving introducing a HAMR medium or a hard disk drive comprising at least one HAMR medium into a magnet housing comprising a degausser, wherein the HAMR medium has a coercivity of between about 20 and 100 kOe at room temperature. A field sufficient to erase the HAMR medium is generated, and at least a portion of the HAMR medium is erased.

These and other features and aspects of various embodiments may be understood in view of the following detailed discussion and accompanying drawings.

DETAILED DESCRIPTION

Figure 1:
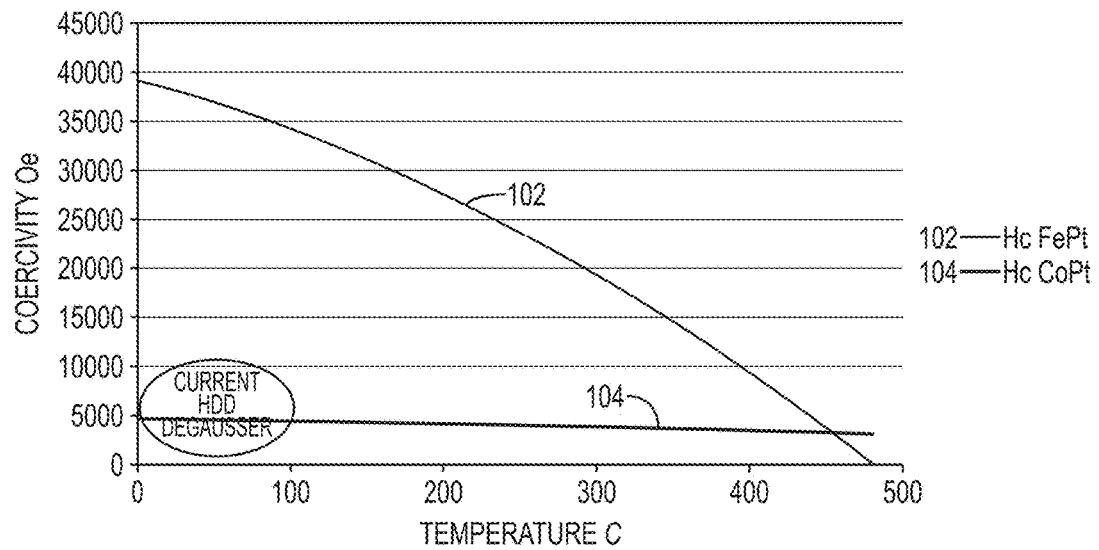
FIG. 1 is a graph illustrating coercivity as a function of temperature for CoPt based perpendicular recording media and for FePt heat-assisted magnetic recording media.

Degaussing is the process of decreasing, or eliminating, a remnant magnetic field. In certain applications, degaussing is performed to destroy data, or erase, magnetic media such as hard drives, disks, and magnetic tape. Applying a magnetic field to magnetic media leaves the magnetic domains in random patterns with no preference to orientation rendering the previously-stored data unrecoverable. When certain magnetic media are degaussed, such as hard drives and magnetic recording disks, the previously-stored servo data is also erased thereby irreversibly erasing the media—barring reformatting by the manufacturer. In many industries such as healthcare and finance, this level of erasure is legally mandated for privacy and security reasons. Companies cannot dispose of electronically stored data without properly erasing the storage media.

A conventional degausser is a machine that produces a magnetic field intense enough to alter, or erase, the magnetic charge of the object (e.g., magnetic medium) exposed to the magnetic field. A number of conventional degaussers are commercially available for erasing magnetic storage media. These degaussers are currently employed to ensure safe disposal of critical and/or personal data in accordance with the law. However, more recent magnetic recording technology such as Heat-Assisted Magnetic Recording (HAMR) extends areal density well beyond 1 Tb/in$^2$, e.g., to 5 Tb/in$^2$ in theory, using the high magnetocrystalline anisotropy of FePt by recording high anisotropy media at elevated temperature.

In HAMR recording, the recording process starts by heating a small region of the disk above Curie temperature ($T_c$) using a laser powered near field plasmonic transducer. The region is subsequently cooled rapidly in the presence of a magnetic field from the recording head. The magnetic field maintains the orientation of magnetization in the local region of heated media as it cools, thereby encoding a bit with data for storage. By reducing the local media anisotropy (K) at high temperature (e.g., above $T_c$), HAMR makes it possible to record data on high anisotropy material such as L1$_0$-FePt. The high anisotropy in L1$_0$-FePt extends the superparamagnetic limit faced with conventional magnetic recording, so that grain size can be further reduced to increase signal-to-noise ratio. Because of the very high media coercivity (e.g., 10-100 kOe at room temperature) of HAMR media, conventional degaussing apparatuses, which generate magnetic field strengths up to 5 kOe, cannot erase HAMR media or HAMR-based hard drives. This leads to a potential data security issue that data may still be recoverable after degaussing HAMR media and HAMR hard drives using a conventional degausser.

Embodiments described herein address a degausser configured to generate a field (e.g., magnetic and/or temperature) sufficient to erase a HAMR medium, or collective HAMR media, where each HAMR medium has a coercivity of between about 10 and 100 kOe (e.g., 40-60 kOe) at room temperature. In some embodiments, the degausser comprises a superconducting magnet arrangement configured to generate a field higher than about 50 kOe (e.g., greater than 70 kOe). In other embodiments, the degausser comprises a heat-assisted degausser comprising a heat source and, optionally, an electromagnet or permanent magnets. A heat-assisted degausser can include any variety of heat sources including, but not limited to, a laser, heater, oven, or a combination thereof. Each of the described embodiments safely erases previously-recorded data on the HAMR media and prepares the HAMR media for reformatting, such as servo and certification writing or for disposal.

Since present magnetic recording media, typically CoPt-based perpendicular recording media have a coercivity of approximately 5 kOe at room temperature, available, conventional degaussers are configured to generate a magnetic field of up to about 10 kOe. For example, National Security Administration (NSA) approved degaussers are certified to erase magnetic tape media up to 2.8 kOe and both Longitudinal Magnetic Recording (LMR) and Perpendicular Magnetic Recording (PMR) hard drives up to about 6 kOe. FIG. 1 illustrates coercivity as a function of temperature for CoPt based perpendicular recording media and for FePt HAMR media. Curve 102 shows the coercivity vs. temperature profile for an FePt HAMR medium. Curve 104 shows the coercivity vs. temperature profile for a conventional, CoPt PMR medium. It can be seen in FIG. 1 that conventional hard disk drive (HDD) degaussers generate a field that is insufficient to modify the magnetic state of the FePt based HAMR media.

Figure 2:
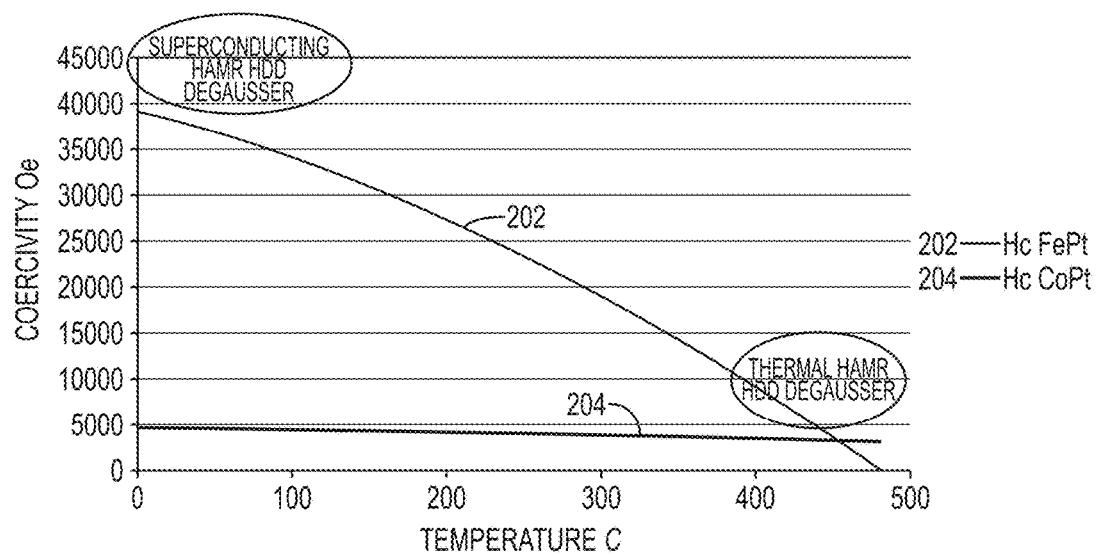
FIG. 2 is a graph illustrating coercivity as a function of temperature for CoPt based perpendicular recording media and for FePt heat-assisted magnetic recording media in accordance with embodiments discussed herein.

FIG. 2 replicates the graph of FIG. 1, and illustrates coercivity as a function of temperature for CoPt based perpendicular recording media and for FePt HAMR media. Curve 202 similarly shows the coercivity vs. temperature profile for an FePt HAMR medium, and curve 204 similarly shows the coercivity vs. temperature profile for a conventional, CoPt PMR medium. FIG. 2 also shows two regimes under which HAMR media could be erased. For example, a very high magnetic field (e.g., >40 kOe) at room temperature, or an elevated temperature field (e.g., >200° C.) can erase a HAMR medium or HAMR hard drive. An additional regime can involve both an elevated temperature (e.g., up to about 200° C.) with a moderate magnetic field (e.g., <15 kOe) for erasing a HAMR medium or HAMR hard drive, for example, when temperatures above 200° C. are impractical or unavailable. Embodiments described herein address a degausser configured to generate at least one field sufficient to erase a HAMR medium. In certain embodiments, a degausser comprises a superconducting magnet configured to generate a magnetic field higher than about 50 kOe. In other embodiments, a heat-assisted degausser may comprise an electromagnet or permanent magnets. Each of these embodiments is discussed further below.

Figure 3A:
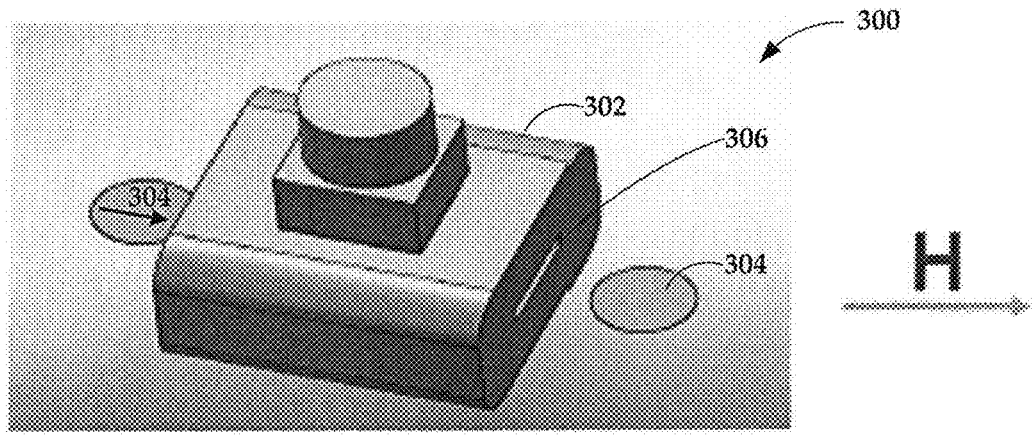
FIG. 3A is a perspective view of a high-field degausser in accordance with embodiments discussed herein.

FIG. 3A is a perspective view of a degaussing arrangement 300 comprising a superconducting magnet. The degaussing arrangement 300 comprises a magnet housing 302, which contains the superconducting magnet. The superconducting magnet is, for example, a DC dipole magnet based on superconducting coils that generate a large (e.g., greater than about 70 kOe) magnetic field in the plane of the HAMR media (designated by "H" in FIG. 3A) being degaussed. Alternative embodiments include generating a large magnetic field out-of-plane of the HAMR media being degaussed. A HAMR medium 304 or drive can be placed on a transport mechanism such as a conveyer belt or a sample holder, and fed through a slot opening in the magnet housing 302, exposing the medium 304 or drive to the large magnetic field. The magnetic field strength is chosen to be higher than the room-temperature coercivity of the medium 304 (e.g., higher than 50 kOe). The HAMR medium 304 then exits the degaussing arrangement 300 through a slot 306, comparable in size to the slot opening. The slot 306 has dimensions configured to accept a single HAMR medium and/or to accept a hard disk drive containing one or more HAMR media. For example, the slot 306 can have a width of about 120 mm and height of about 20 mm to accommodate a hard disk drive or individual disks, or a width of about 65-95 mm to accommodate individual disks. However the slot 306 can have a variety of dimensions configured to accommodate recording media individually or in combination, such as collected in a caddy.

Figure 3B:
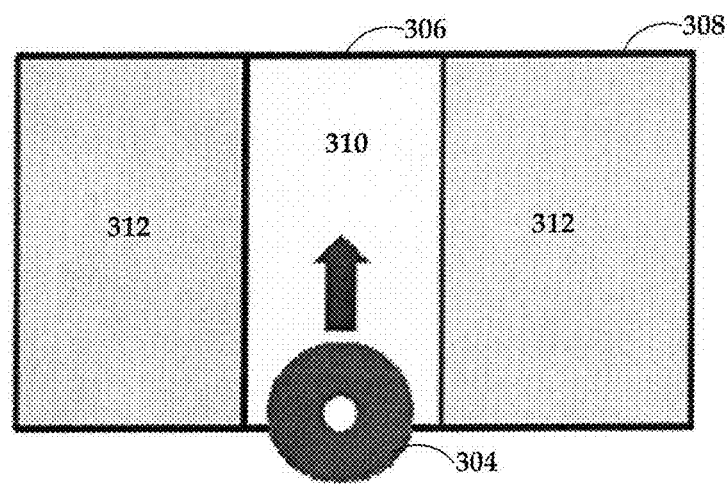
FIG. 3B is a top-down view of a medium's path through a high-field degausser in accordance with embodiments discussed herein.
Figure 3C:
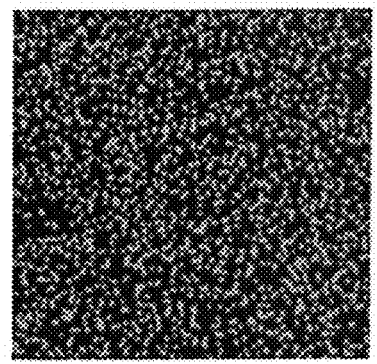
FIG. 3C illustrates the magnetization of a medium after degaussing with a high-field degausser in accordance with embodiments discussed herein.

A degausser 308 is further illustrated in FIG. 3B. The HAMR medium 304 follows a path, e.g., an elongated slot, 310 through the degausser 308 housed in the magnet housing 302 of FIG. 3A. The degausser 308 includes a superconducting magnet arrangement 312 with opening slits in the middle of the magnet, so that either a single disk or several disks can be passed through the magnet and be erased, with a large (e.g., >50 kOe, or 50-100 kOe) field applied in the plane of the disk. The width and thickness dimensions of the opening slot, and path 310, shall accommodate typical recording disk dimensions (e.g., 54-97 mm in diameter), so the slit shall be about 100-150 mm wide, and about 5-40 mm thick to reduce the added size of the magnet arrangement 312 in the housing 302. In certain embodiments, an entire hard disk drive can be inserted through the magnetic slit (e.g., when the slit is about 150×25 mm). The superconducting magnet arrangement 312 can include a DC dipole magnet, e.g., comprising superconducting coils, a solenoid, and/or one or more non-sweeping, high-temperature superconducting magnets alone or in combination. The superconducting magnet arrangement 312 can generate a magnetic field strength of greater than about seven Tesla in a 100 mm by 5 mm volume. Neither magnetic field uniformity nor ramping of the magnetic field is required. When exposed to a high magnetic field in such a superconducting degaussing arrangement 300, a HAMR medium or HAMR disk drive can be erased in approximately 1-10 seconds. After removal from the degausser 308, the magnetization of the HAMR medium 304 is randomized, e.g., the stored information has been erased, as illustrated by the random dark and light areas of FIG. 3C, which represent a portion of an erased HAMR medium.

In alternative embodiments, heat may be applied to the HAMR media. A temperature field may be applied in lieu of a magnetic field, prior to application of a magnetic field, or during application of a magnetic field. The coercivity of a HAMR medium will lower at elevated temperatures. Exploiting this property, a HAMR medium can be heated, for example, by an oven-based heating or laser heating, to a temperature above Curie temperature or blocking temperature ($T_b$), which is about 400-500° C. The HAMR medium's magnetization will be randomized upon cooling through the Curie temperature, even without application of a magnetic field, to degauss, or erase, the HAMR medium. A HAMR medium can also be heated and then subjected to an external magnetic field generated by a conventional magnet (e.g., electromagnet or permanent magnet arrangement). When both a temperature field and a magnetic field are applied, the HAMR medium may be heated to a lesser temperature, e.g., about 200° C.

Figure 4A:
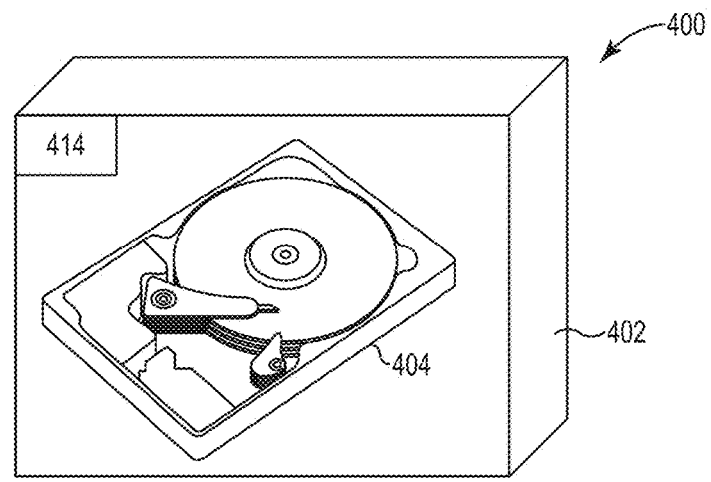
FIG. 4A is a perspective view of a heat-assisted degausser in accordance with embodiments discussed herein.

FIG. 4A illustrates a heat-assisted degaussing arrangement 400. The arrangement 400 includes a housing 402 configured to generate a temperature field and optionally a magnetic field to degauss HAMR media 404. According to some embodiments, a degausser comprises a heater, such as an oven, to heat the HAMR media 404 or drive to elevated temperatures (~400° C.). Applying a temperature field of about 400-500° C. can randomize the magnetization of the HAMR medium, effectively degaussing the medium as the medium cools. In some embodiments, a magnetic field of approximately 5-20 kOe is also applied to the media while the media is being heated or directly thereafter. In further embodiments, the media due to the blocking temperature, or the carrier containing the media (e.g., a caddy, a hard disk drive) cannot withstand such high temperatures. For example, if the media cannot be heated above the blocking temperature, e.g., components of the hard drive might melt, a magnetic field is needed. Thus, a temperature field below the blocking temperature may be applied, e.g., about 200° C., with a magnetic field of approximately 10-20 kOe for a period of time sufficient to erase any magnetization pattern (e.g., 1-10 seconds). FIG. 4A illustrates both fields being applied within the same housing 402 to a stationary media 404.

Figure 4B:
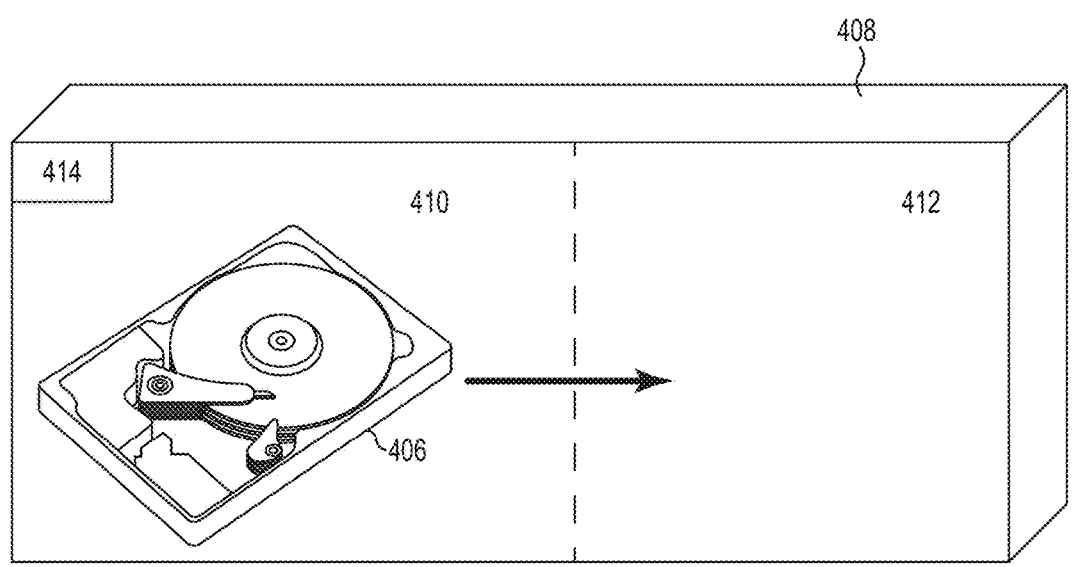
FIG. 4B is a perspective view of a heat-assisted degausser in accordance with embodiments discussed herein.

Alternatively, the media or drive 406 can be heated (e.g., in an oven) and then moved into a high magnetic field as shown in FIG. 4B. If a conveyor moves the media or drive(s) from the oven to the high magnetic field in a short period of time (e.g., approximately one second), the media or drive 406 will not cool substantially. The magnetic field may be constant or may vary with time to induce either a uniform or spatially varying magnetization pattern on the media. Control circuitry 414 within, or exterior to, the housing 402, 408, is used to customize the erasure of HAMR media. For example, the media or drive 406 can be degaussed by applying an alternating field that is reduced in amplitude over time from an initial high value (i.e., AC powered), or the media or drive 406 can be saturated by applying a unidirectional field (i.e., DC powered or by employing a permanent magnet). While FIG. 4B shows the media 406 being moved from one applied field (e.g., temperature) 410 to another (e.g., magnetic) 412 within a shared housing 408, the two fields could be generated and applied in separate housings with the media 406 transported there between.

Figure 5:
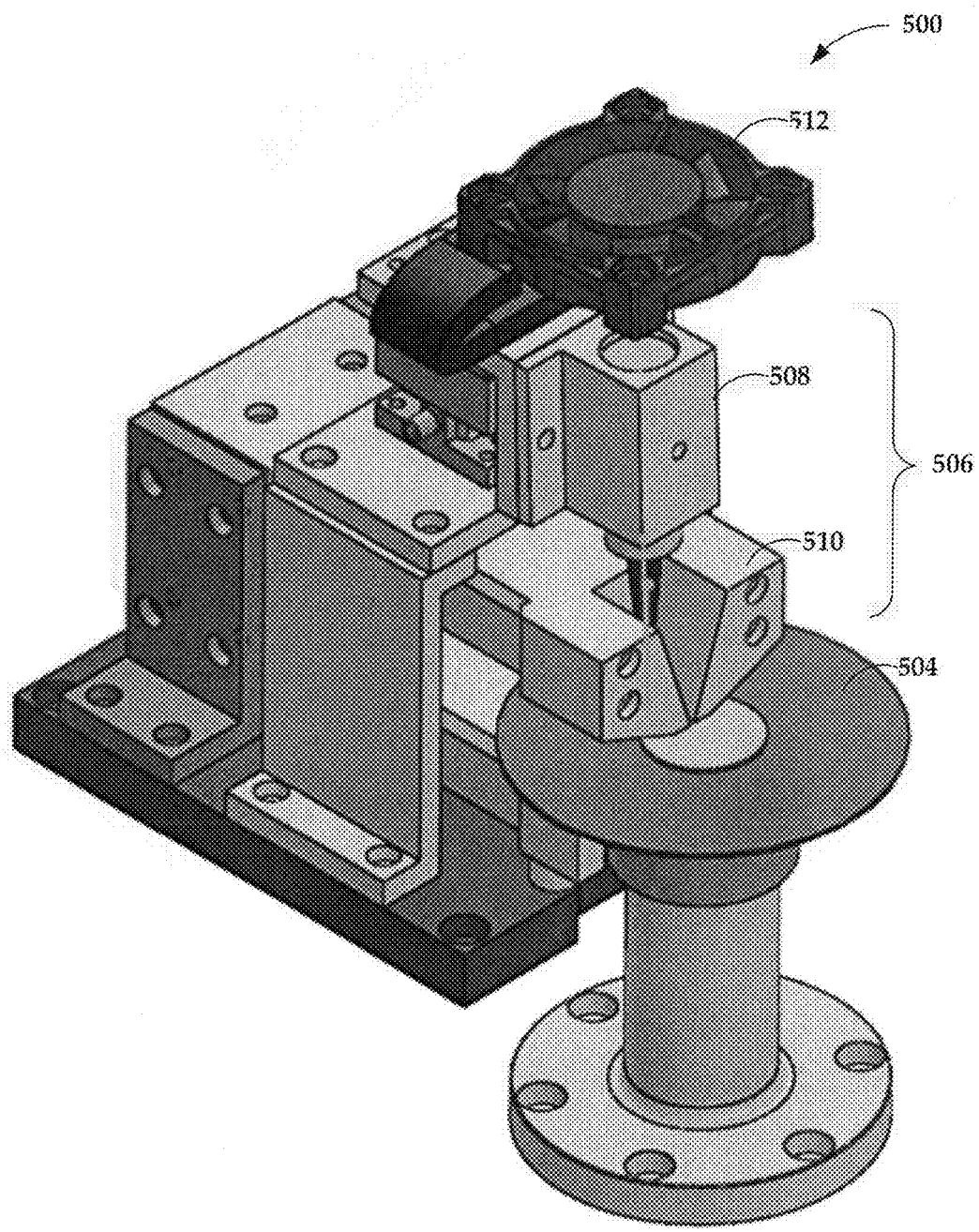
FIG. 5 is a perspective view of a heat-assisted degausser in accordance with embodiments discussed herein.

FIG. 5 illustrates a further embodiment of a heat-assisted degaussing arrangement 500. According to some embodiments, a heat-assisted degausser incorporates a magnet arrangement 512 comprising a conventional electromagnet or a permanent magnet arrangement generating a field strength of between about 5 and 20 kOe. Electromagnetic degaussers generate a magnetic field by charging a degaussing coil, whereas permanent magnet degaussers contain one or more rare earth magnets and do not require electricity to operate. The degaussing arrangement 500 of FIG. 5 further includes a laser-heating arrangement 506 for erasing HAMR media.

A high power laser (e.g., >1 watt) 508 can be used to heat HAMR media. The laser 508 is focused on a medium 504, to generate a temperature field to heat a portion of the medium 504 (e.g., one or more bands of data tracks) to elevated temperatures. The laser 508 is focused using an optical arrangement 510 which can include mirrors, lenses, and other optical features. In some embodiments, an electromagnet generates a small magnetic field (e.g., 1-20 kOe) to assist in erasing the medium 504. However, a sufficiently high temperature field above Curie temperature (e.g., about 300-500° C.) can erase the medium 504 without assistance from an external magnetic field. Once one band of tracks is erased, control circuitry rasters the laser arrangement 506 across the medium 504 to erase another band to selectively erase portions of the HAMR medium 504 or to eventually achieve full disk erase. The rastering can be performed by moving one or more components of the laser-heating arrangement 506 and/or by rotating the medium 504.

Figure 6:
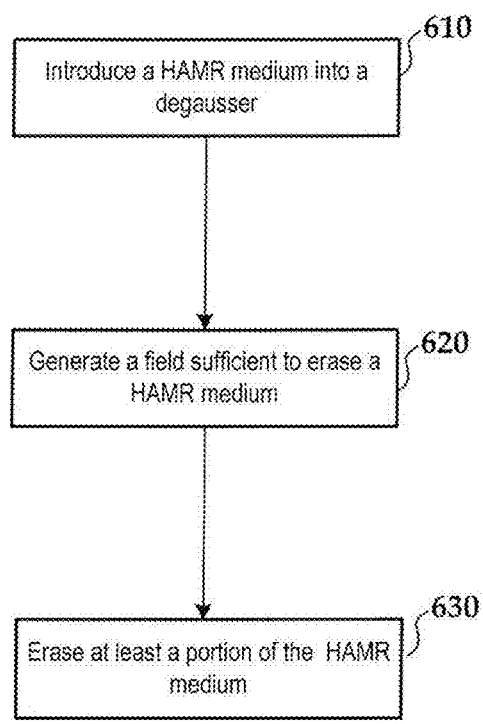
FIG. 6 is a flow diagram illustrating a method of erasing a heat-assisted magnetic recording medium in accordance with embodiments discussed herein.

FIG. 6 is a flow diagram of a process of erasing a HAMR medium in accordance with various embodiments described herein. The HAMR medium comprises a magnetic media stack having a coercivity of between about 30 and 100 kOe at room temperature. The HAMR medium, or a hard disk drive comprising at least one HAMR medium, is introduced into a magnet housing comprising a degausser 610. At least one field sufficient to erase the HAMR medium is generated 620, and at least a portion of the HAMR medium is erased 630. The degausser generates the magnetic field by either utilizing a super conducting magnet arrangement and/or utilizing a conventional electromagnet or permanent magnet arrangement in combination with the application of a temperature field to the HAMR medium. The degausser can also apply a high temperature field (e.g., about 300-500° C.) without a magnetic field to erase the HAMR medium.

In certain embodiments, the HAMR medium is heated in an oven while a magnetic field is generated in situ. In other embodiments, a temperature field is applied to heat the HAMR medium and then the medium is transported to a magnet housing for application of a magnetic field. In further embodiments, localized heating, e.g., via a laser arrangement, and/or localized application of a magnetic field may be used to erase specified portions of a HAMR medium such as by rastering over bands of data. Alternatively, localized heating can be combined with a general exposure to a magnetic field, and vice versa. In further embodiments, the entire HAMR medium is erased via subsequent rastering. When a temperature field is applied in degaussing, the HAMR medium is heated to a temperature of at least about 200° C. Depending on whether the HAMR medium is contained in an enclosure, and the type of enclosure, the HAMR medium may be heated to a temperature in a range of about 200 to about 500° C.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above but should be defined only by the claims set forth below and equivalents thereof.

What is claimed is:

1. An apparatus, comprising:
   a magnet housing dimensioned to receive a heat-assisted magnetic recording (HAMR) medium or a hard disk drive comprising at least one HAMR medium; and
   a degausser disposed in the magnet housing and configured to generate at least one field sufficient to erase the HAMR medium, wherein at least one field is a magnetic field and the degausser comprises a superconducting magnet arrangement configured to generate a magnetic field higher than about 50 kOe, and the HAMR medium has a coercivity of between about 20 and 100 kOe at room temperature.

2. The apparatus of claim 1, wherein the degausser is configured to generate the field sufficient to erase the HAMR medium, the HAMR medium having a coercivity of between about 20 and 60 kOe at room temperature.

3. The apparatus of claim 1, wherein the superconducting magnet arrangement comprises a DC dipole magnet or solenoid.

4. The apparatus of claim 1, wherein the superconducting magnet arrangement comprises a DC dipole magnet comprising superconducting coils.

5. The apparatus of claim 1, wherein the superconducting magnet arrangement has a field strength of greater than about 7 Tesla.

6. An apparatus, comprising:
a magnet housing dimensioned to receive a heat-assisted magnetic recording (HAMR) medium or a hard disk drive comprising at least one HAMR medium; and
a degausser disposed in the magnet housing and configured to generate at least one field sufficient to erase the HAMR medium, wherein at least one field is a temperature field and the degausser comprises an oven, and the HAMR medium has a coercivity of between about 20 and 100 kOe at room temperature.

7. The apparatus of claim 6, wherein the degausser comprises a laser.

8. The apparatus of claim 6, wherein the degausser is configured to heat the HAMR medium to a temperature of between about 300 and 500° C.

9. The apparatus of claim 6, wherein the at least one field further comprises a magnetic field and the degausser comprises a heat-assisted degausser comprising a conventional electromagnet or permanent magnets.

10. The apparatus of claim 9, wherein the electromagnet or permanent magnets have a field strength of up to about 20 kOe.

11. The apparatus of claim 9, wherein the degausser is configured to erase a portion of the HAMR medium, the portion being less than the entire HAMR medium.

12. The apparatus of claim 9, wherein the temperature field and magnetic field are applied concurrently.

13. The apparatus of claim 1, wherein the magnet housing comprises a transport mechanism configured to move the HAMR medium or drive relative to the degausser and into and out of the housing.

14. A method comprising:
introducing a heat-assisted magnetic recording (HAMR) medium or a hard disk drive comprising at least one HAMR medium into a magnet housing comprising a degausser, wherein the degausser comprises an oven, and the HAMR medium has a coercivity of between about 30 and 100 kOe at room temperature;
generating a temperature field sufficient to erase the HAMR medium; and
erasing at least a portion of the HAMR medium.

15. The method of claim 14, wherein erasing the HAMR medium comprises erasing the entire HAMR medium.

16. The method of claim 14, further comprising:
heating the HAMR medium to a temperature of at least about 200° C.

17. The method of claim 16, further comprising:
transporting the HAMR medium to the magnet housing in response to heating the HAMR medium.

18. The apparatus of claim 6, wherein the magnet housing comprises a transport mechanism configured to move the HAMR medium or drive relative to the degausser and into and out of the housing.

19. The method of claim 16, further comprising:
generating a magnetic field sufficient to erase the HAMR medium.

* * * * *